US006471254B2

(12) United States Patent
Russell

(10) Patent No.: US 6,471,254 B2
(45) Date of Patent: Oct. 29, 2002

(54) METHOD AND APPARATUS FOR GRIPPING OBJECTS

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 32 days.

(21) Appl. No.: 09/788,969

(22) Filed: Feb. 19, 2001

(65) Prior Publication Data
US 2001/0045747 A1 Nov. 29, 2001

Related U.S. Application Data
(60) Provisional application No. 60/184,171, filed on Feb. 21, 2000, and provisional application No. 60/184,169, filed on Feb. 21, 2000.

(51) Int. Cl.⁷ .............................................. E21B 17/00
(52) U.S. Cl. .................... 285/338; 285/346; 166/242.3; 277/343
(58) Field of Search .............................. 285/123.14, 23, 285/338, 345, 346; 166/242.2, 242.3, 101, 179, 182; 138/89; 277/343, 609; 156/245

(56) References Cited

U.S. PATENT DOCUMENTS

| 2,962,096 A | 11/1960 | Knox | |
|---|---|---|---|
| 3,013,825 A | 12/1961 | Wilson | |
| 3,163,223 A | * 12/1964 | Bauer et al. | ................ 285/338 |

(List continued on next page.)

FOREIGN PATENT DOCUMENTS

| CA | 538890 | * 4/1957 | ................ 285/338 |
|---|---|---|---|
| DE | 24 39 100 | 2/1976 | |
| SU | 394563 | * 8/1973 | ................ 285/338 |

OTHER PUBLICATIONS

"Keyless Devices Get a Grip on Shafts", *Power Transmission Design*, Oct., 1997, pp 23–27.
"Spieth Hydraulically Actuated Guiding and Clamping Sleeves", Brochure, Advanced Machine & Engineering Co., Rockford, Illinois.
"Expandable Diameter Fasteners", Brochure, Shur–Lock Corporation, Irvine, California.
"Trantorque", Brochure, Tantorque Corporation, Manheim, Pennsylvania, 1978.
"Amlok Rod Clamps", Brochure, Advances Machine & Engineering Co., Rockford, Illinois.

(List continued on next page.)

*Primary Examiner*—Eric K. Nicholson
(74) *Attorney, Agent, or Firm*—Elizabeth R. Hall

(57) ABSTRACT

An elastomeric gripping element is supported and mounted by a housing and is configured to have an interference fit under normal conditions with the surface of the object to be gripped. The housing and the surface to be gripped are separated by a gap. For gripping mating with the surface, the elastomeric gripping element is initially stretched by operative means in the housing element in an axial direction parallel to the generating element of the comating surface to be gripped, with an attendant reduction in its cross-sectional thickness perpendicular to the direction of stretch. In this manner, the gripping element interference with the comating surface of the object to be gripped is minimized or eliminated for installation. When positioning for the installation mating is accomplished, the gripping element tension is selectively released, permitting the gripping element to attempt to return to an unstretched position and thereby to assume a preloaded position against the comating surface. Release of the gripped object is accomplished by retensioning the elastomeric gripping element. The gripping element may be repeatably disengaged and reengaged by selectably restretching the gripping element and then selectably releasing it upon completion of repositioning.

42 Claims, 5 Drawing Sheets

U.S. PATENT DOCUMENTS

| | | | |
|---|---|---|---|
| 3,375,013 A | | 3/1968 | Grantom |
| 3,436,084 A | * | 4/1969 | Courter .................... 285/338 |
| 4,105,262 A | | 8/1978 | Richey |
| 4,121,675 A | | 10/1978 | Nixon |
| 4,131,167 A | | 12/1978 | Richey |
| 4,240,473 A | * | 12/1980 | Leonard .................... 285/338 |
| 4,438,822 A | | 3/1984 | Russell |
| 4,505,499 A | * | 3/1985 | Uglow et al. ............. 285/338 |
| 4,531,768 A | * | 7/1985 | Summers .................. 385/338 |
| 4,728,125 A | | 3/1988 | Reneau |
| 5,052,726 A | | 10/1991 | Logsdon |
| 5,992,899 A | * | 11/1999 | Strowe ...................... 285/346 |

OTHER PUBLICATIONS

"Keyless Shaft Couplings by Mapeco Products", Brochure, Mapeco Products, Locust Valley, New York.

"Amlock Hydraulic Squeeze Bushing", Brochure, Advanced Machine & Engineering Co., Rockford, Illinois.

"ETP Bushings", Brochure, Zero–Max/Helland Motion Control Products, Minneapolis, Minnesota, 1992.

"Amlok Hydraulic Clamp Disks and Clamp Rings", Brochure, Advanced Machine & Engineering Co., Rockford, Illinois.

"No–Weld Adapter", Brochure, Stewart & Stevenson, Houston, Texas [U.S. Patent 4,799,714].

"Ratio Clamp", Brochure, Hänchen Hydraulik GmbH, Ostfildern, Germany.

"Morgrip Weldless Pipeline Connection Systems", Brochure, Morgrip Products, Walsall, England.

"New Mechanical Hot Tap Clamp Introduced in Gulf of Mexico", Reprint of Article by Gulf Publishing Co., Houston, Texas, 1994.

"Emtec Sure–Grip Drilling Centralizer, Emtec Drilling Jar", Brochure, Emtec, Dallas, Texas.

\* cited by examiner

METHOD AND APPARATUS FOR GRIPPING OBJECTS

CROSS-REFERENCE TO RELATED APPLICATION

The present application, pursuant to 35 U.S.C. 111(b), claims the benefit of the earlier filing date of provisional application Ser. No. 60/184,171 filed Feb. 21, 2000, and entitled "Method and Apparatus for Gripping Objects". The present application is related to provisional application Ser. No. 60/184,169 also filed Feb. 21, 2000 and entitled "Novel Method and Apparatus for Sealing."

BRIEF DESCRIPTION OF THE INVENTION

The present invention relates to a method and apparatus for selectively gripping and releasing objects. More particularly, the invention relates to an elastomeric gripping element mounted in a housing and configured to have an interference fit under normal conditions with the surface of the object to be gripped.

BACKGROUND OF THE INVENTION

There are a number of devices used to grip shafts, pipes, and other objects, some of which have been in use for a number of years. Almost all of the gripping devices currently being used operate in an active manner. An "active" operating device is one that is normally not in a gripping configuration, but must be selectively and actively forced into gripping an object. In contrast, "passive" devices normally exist "at rest" in a gripping mode. Such passive devices must be selectively operated to cause them to not grip an object.

Tubular collets or split rings which obtain their flexibility by provision of one or more slots in a metallic tube wall parallel to the tube axis and which change the gripping surface diameter by wedging on conical surfaces due to application of axial loads constitute a large, general class of gripping devices. Examples of this class of device are illustrated in several patents such as Knox U.S. Pat. No. 2,962,096; Richey U.S. Pat. No. 4,105,262; Russell U.S. Pat. No. 4,438,822; Reneau U.S. Pat. No. 4,728,125; and Nagano et al. West Germany Patent 24 39 100.

These collet or split ring devices are active devices, requiring the application of force to distort a normally nongripping element into a gripping configuration. Such devices normally have a very limited range of diameters which they can grip. When such devices are forced to distort too much they undergo permanent deformation. For example, collets can normally provide only limited gripping without being permanently distorted.

A similar class of active device uses a solid metallic ring or tube extension which fits very closely to the surface to be gripped and wedges conically tapered surfaces under the action of axial loads to effect gripping. The solid metallic ring is forced against the gripped surface by the wedging action. Such devices require a careful control of diameters of the gripping and gripped surfaces in order to avoid permanent distortions to the gripping ring. Examples of such devices are the Amlok devices, obtainable from Advanced Machine and Engineering, Rockford, Ill. and devices obtainable from Hänchen Hydraulic Gmbh, Ostfildem, Germany.

The Mapeco shaft coupling (Mapeco Products, Locust Valley, N.Y.) operates with the same type of solid ring gripping mechanism as the Amlok and Hänchen devices. However, the Mapeco device must be actively actuated by hydraulic pressure to grip.

Another class of gripping devices produces metal-to-metal gripping engagement for shafts by means of active hydraulically induced bulging of a gripping sleeve to cause it to distort into engagement with the gripped object. The Amlok hydraulic squeeze bushing (Advanced Machine and Engineering, Rockford, Ill.) requires active maintenance of hydraulic pressure in order to maintain its grip. The ETP bushing (Zero-Max/Helland Motion Control Products, Minneapolis, Minn.) uses a permanently entrapped somewhat compressible fluid to induce clamping. Yet the fluid must be constantly pressurized by a piston actuated by screws. Both types of bulging sleeve can operate only over very small gripping diameter ranges. Similarly, Amlok clamp disks and rings operate by selectably applied active direct compression of the gripped object, thereby permitting development of friction on the contact interface.

Non-split mechanical ring gripping devices may be actively forced under application of axial loads into gripping by flexurally deforming into contact with the gripped surface. Speith hydraulic actuated clamping sleeves (Advanced Machine and Engineering, Rockford, Ill.) uses a circumferentially convoluted sleeve for a flexural gripping device, whereas Russell (U.S. Pat. No. 4,438,822) uses an array of Belleville springs for gripping. Both types of device have only a very limited range of gripping diameters without undergoing permanent deformation.

A very common type of gripping device termed a 'slip' is based upon wedging of one or more discrete wedges of either planar or arcuate construction. Examples of such gripping devices can be obtained from Stewart & Stevenson, Houston, Tex. and Morgrip Products, Walsall, England. The wedges of these devices are normally actively biased into engagement with the gripped object by gravity or springs. Such slips are unidirectional gripping devices which will resist motion in the direction which tightens the wedge, but will release for motions which will loosen the wedge. Most slips have relatively steep wedge angles so that they are self-releasing when subjected to reversed axial loads. In addition, some slips come with separately operable release mechanisms which pull the wedges out of engagement. The Stewart & Stevenson slips for their conductor pipe connector are of a conventional construction, but are not readily releasable. Oilfield drill pipe slips are a more typical construction. The Morgrip Pipe Clamp uses wedged rolling balls as slips in a manner similar to a common type of one-way clutch. Slips are used to grip objects which have a relatively large size variation capability. One major disadvantage with many slips is induced damage to the gripped surface from teeth on the face of the slips or, for the Morgrip Pipe Clamp, from the balls.

Knox U.S. Pat. No. 2,962,096 and Russell U.S. Pat. No. 4,438,822 disclose rubber rings which are actively axially compressed to grip. The Knox rubber ring is intended to seal against a pipe, but in the process provides some level of gripping. Both devices function similarly to the expandable rubber bottle stoppers which are actively caused to expand to seal and grip by axial squeezing applied by a camming lever.

Nixon U.S. Pat. No. 4,121,675 works similarly to the Russell rubber gripper, but utilizes knitted metal instead of rubber. Rubber collets are commonly used in machine shops to grip drills or tool shanks. These devices use active axial compression of the rubber element against a cylindrical case with a self-releasing conically tapered back wall to cause the rubber to distort to induce gripping. Normally, radial steel inserts embedded in the rubber are used to grip the object, rather than using the rubber directly. Rubber collets accurately and effectively grip over a large diameter range.

Richey U.S. Pat. No. 4,131,167 discloses an active helical spring gripping mechanism which uses twisting of the spring to cause it to grip a cylinder. The gripping is through friction developed in a manner somewhat comparable to a wrap spring one-way clutch, but the spring ends must be actively held in a tightly wound condition to grip.

Russell U.S. Pat. No. 4,438,822 discloses the only known passive device. This Russell device has a passive torsional spring gripper which normally has an interference fit with the surface to be gripped. The spring is twisted to get it to release. Both this device and that of Richey can experience difficulty with the initial establishment of gripping due to buildup of friction not permitting full engagement with the gripped object over the full length of the helix. Additionally, both devices are sensitive to vibrations and are not well suited for axial load resistance.

Thus, a need exists for a passive preloading gripping device that does not rely on applying external mechanical force to efficiently initiate or maintain the gripping action on an object.

SUMMARY OF THE INVENTION

The invention contemplates a simple, inexpensive device for solving the problems and disadvantages of the prior approaches discussed above. The present invention provides a rapid, reliable and accurate gripping of objects without the application of an external mechanical force to efficiently initiate or maintain the gripping action on an object.

One aspect of the present invention is a gripping apparatus having a housing, an elastomeric gripping element anchored to one end of the housing, a reciprocable movable end attached to the gripping element, and a means for reciprocably moving the movable end between a first position and a second position, such that when the movable end is in the first position the gripping element is stretched and when the movable end is in the second position the gripping element is relaxed.

Another aspect of the present invention is a gripping device having an elastomeric gripping element securely attached to a static anchor end and a moveable end, where the movable end is moved in either direction with a hydraulically actuated piston.

Yet another aspect of the invention is a gripping apparatus having an elastomeric gripping assembly that has an elastomeric gripping element containing an embedded antiextrusion device, a static anchor end and a movable end. The movable end can be moved from its original position to stretch the elastomeric gripping element and can be returned to its original position to relax the gripping element and release the object being gripped.

Still yet another aspect of the invention is a process for gripping an object comprising the steps of: (a) selecting the object to be gripped by a gripping apparatus having a housing, an elastomeric gripping element anchored to one end of the housing, a reciprocable movable end attached to the gripping element, and a means for reciprocably moving the movable end between a first position and a second position, such that when the movable end is in the first position the gripping element is stretched and when the movable end is in the second position the gripping element is relaxed; (b) moving the movable end of the gripping apparatus to the first position to stretch the gripping element; (c) inserting the object to be gripped into the interior of the gripping apparatus; and (d) moving the movable end toward the second position to bias the gripping element against the object to be gripped.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

The novel features which are believed to be characteristic of the invention, both as to its structure and methods of operation, together with the objects and advantages thereof, will be better understood from the following description taken in conjunction with the accompanying drawings, wherein.

DETAILED DESCRIPTION OF THE INVENTION

The present invention is a passive preloading gripping device that does not rely on applying or maintaining external mechanical force to efficiently initiate or maintain its gripping action on an object.

Figure 1:
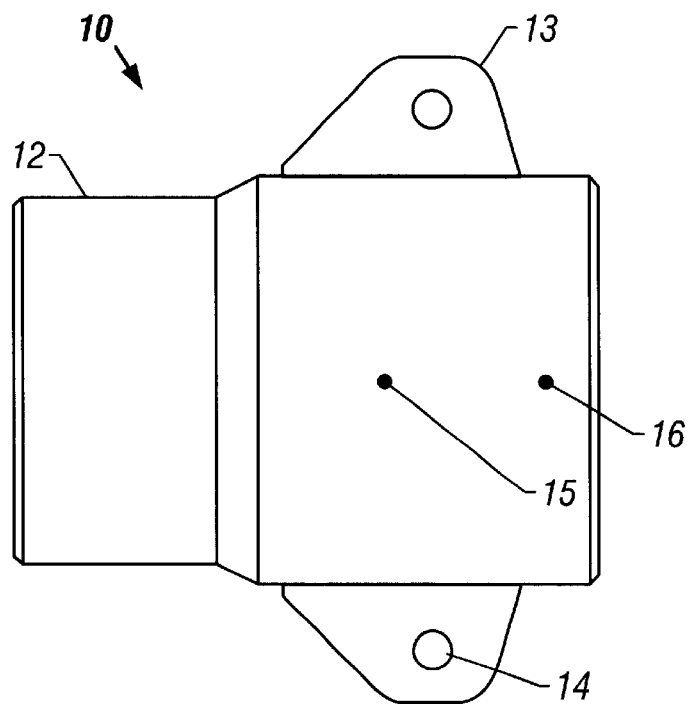
FIG. 1 shows a side view of one embodiment of a gripping device.
Figure 2:
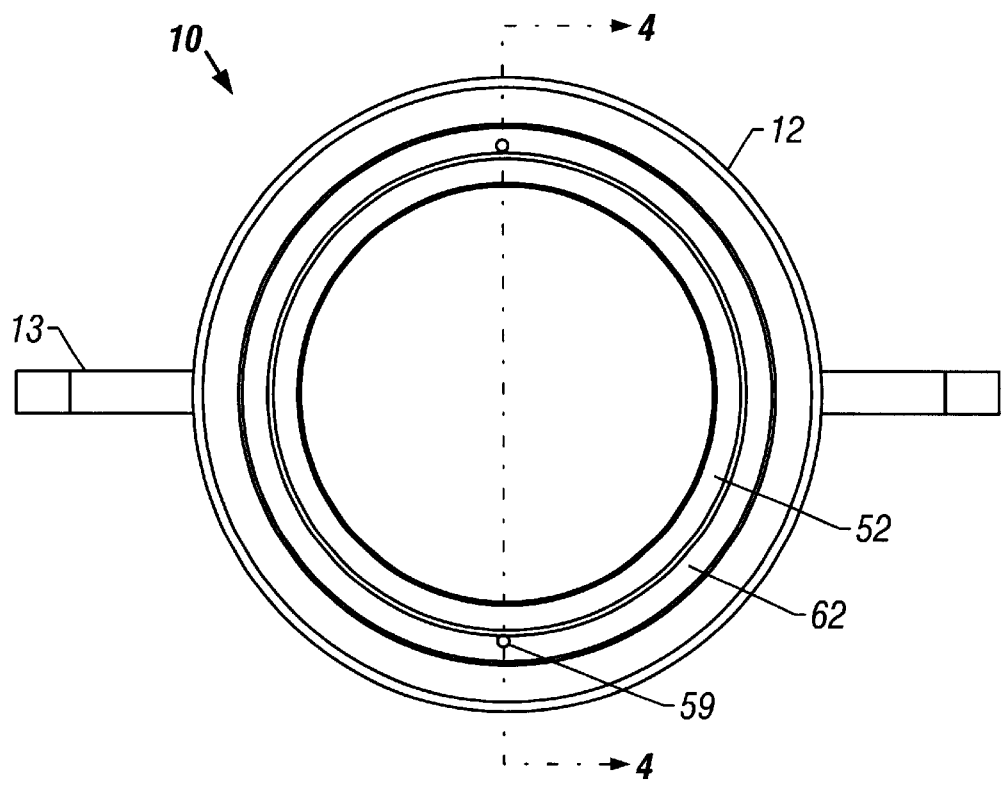
FIG. 2 shows an axial, frontal view of the gripping device of FIG. 1.

Referring now to the drawings, and initially to FIGS. 1 and 2, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

FIGS. 1 and 2 illustrate a gripping device 10 mounted in a tubular housing 12. The exterior of tubular housing 12 has an increased diameter at its upper end (the right side of the drawing) to accommodate the actuating means for the device and to structurally support mirror image integral ears 13 with through hole lifting eyes 14 provided for handling purposes. First hydraulic actuation port 15 and second hydraulic actuation port 16 are connected to sealed chambers inside the body for selective operation of the mechanism of this device.

Figure 3:
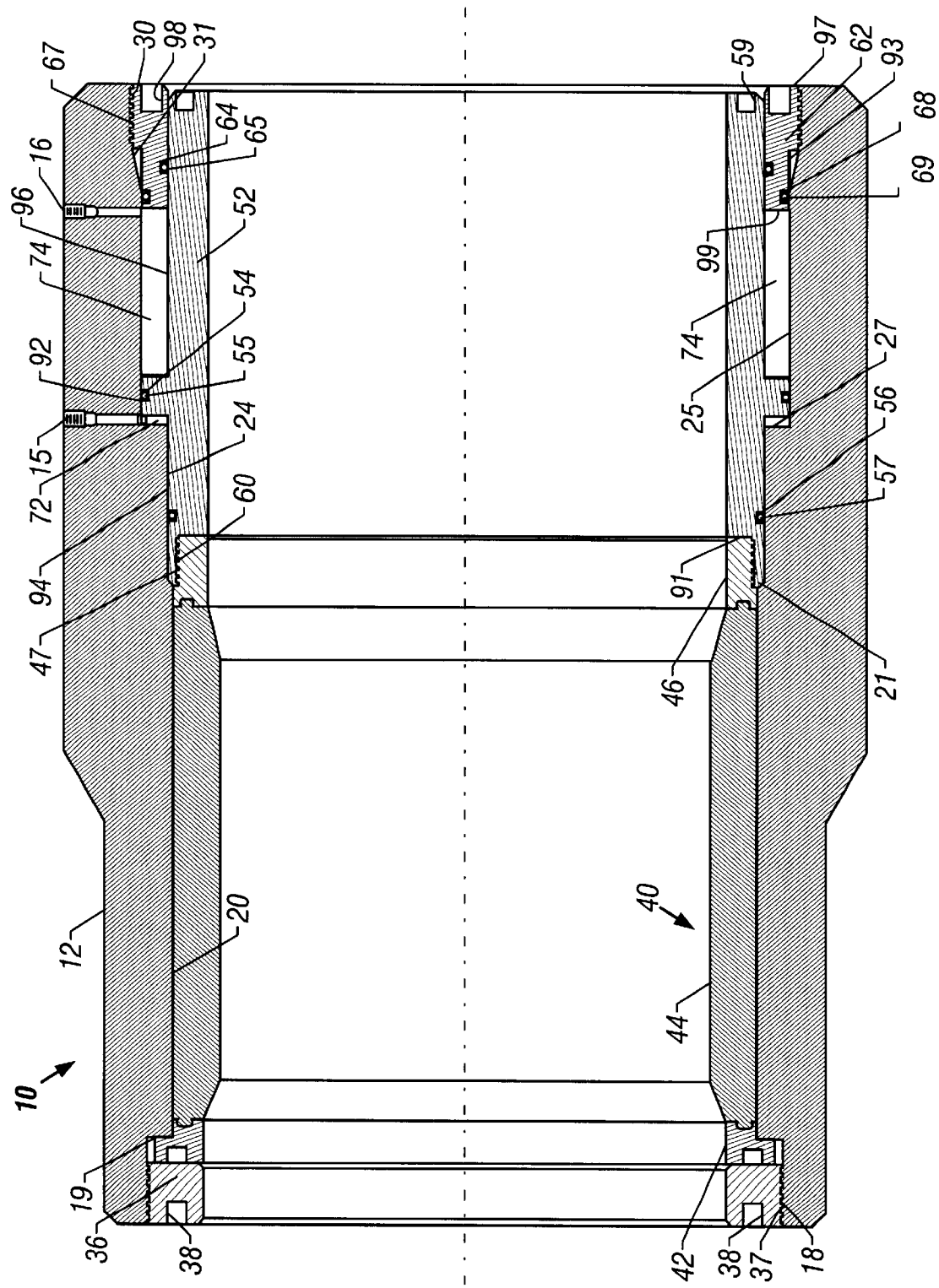
FIG. 3 is a longitudinal sectional view of the gripping device of FIG. 1 with a relaxed gripping element.
Figure 4:
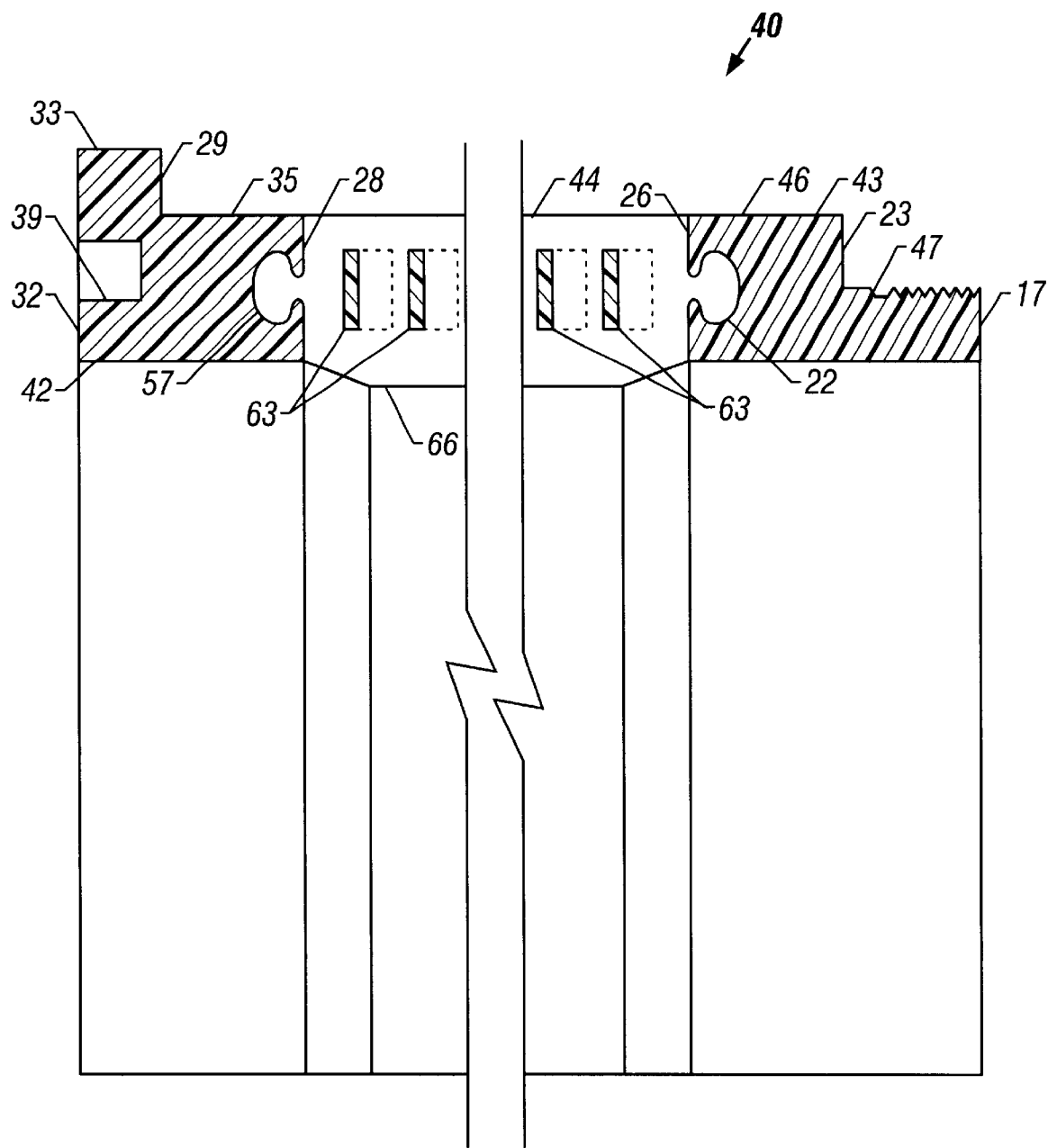
FIG. 4 is a quarter-sectional view of a molded gripping assembly having an at-rest stretchable gripping element.
Figure 5:
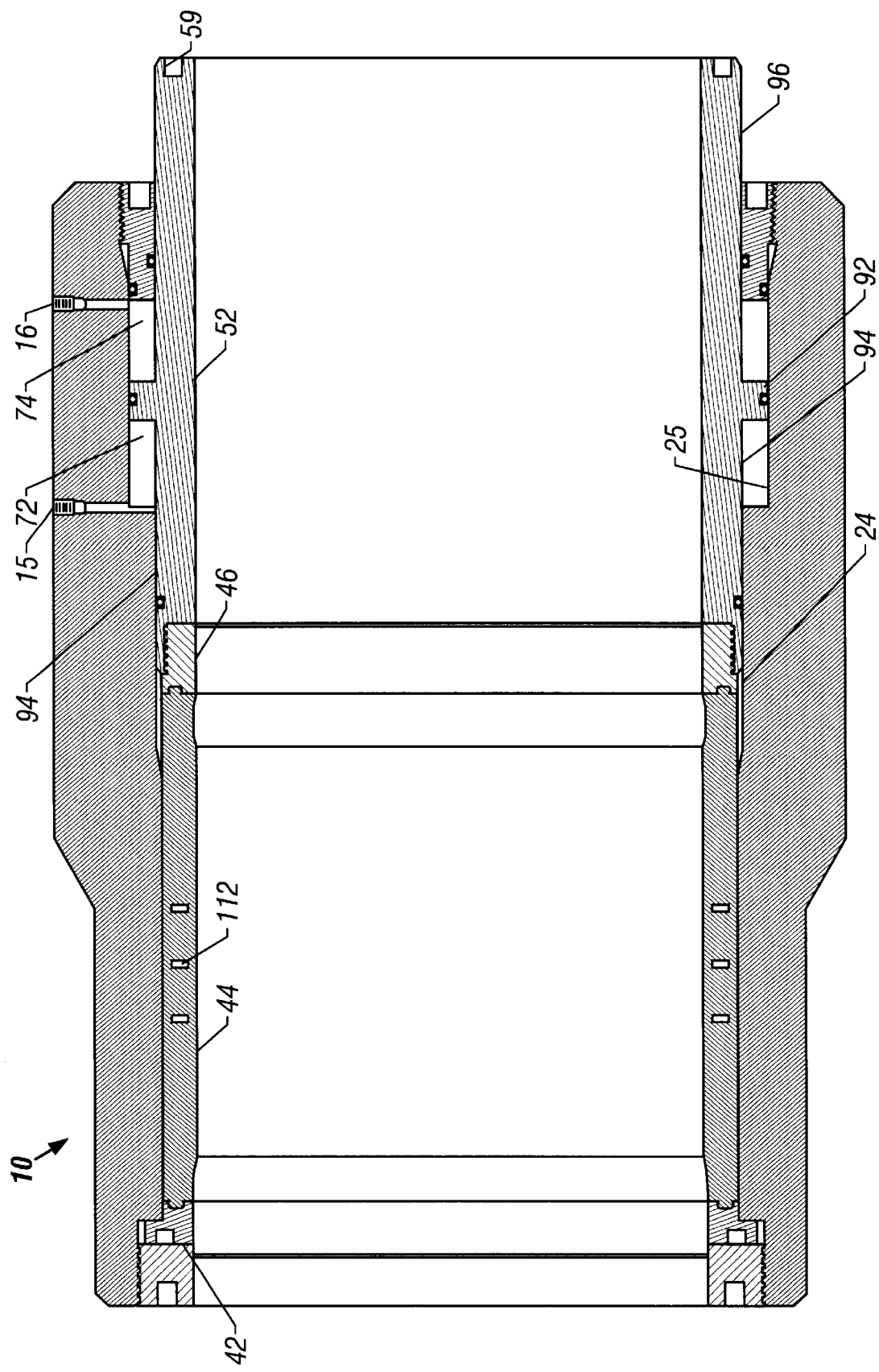
FIG. 5 is a longitudinal sectional view of the gripping device of FIG. 1 with a stretched gripping element ready to engage an object.
Figure 6:
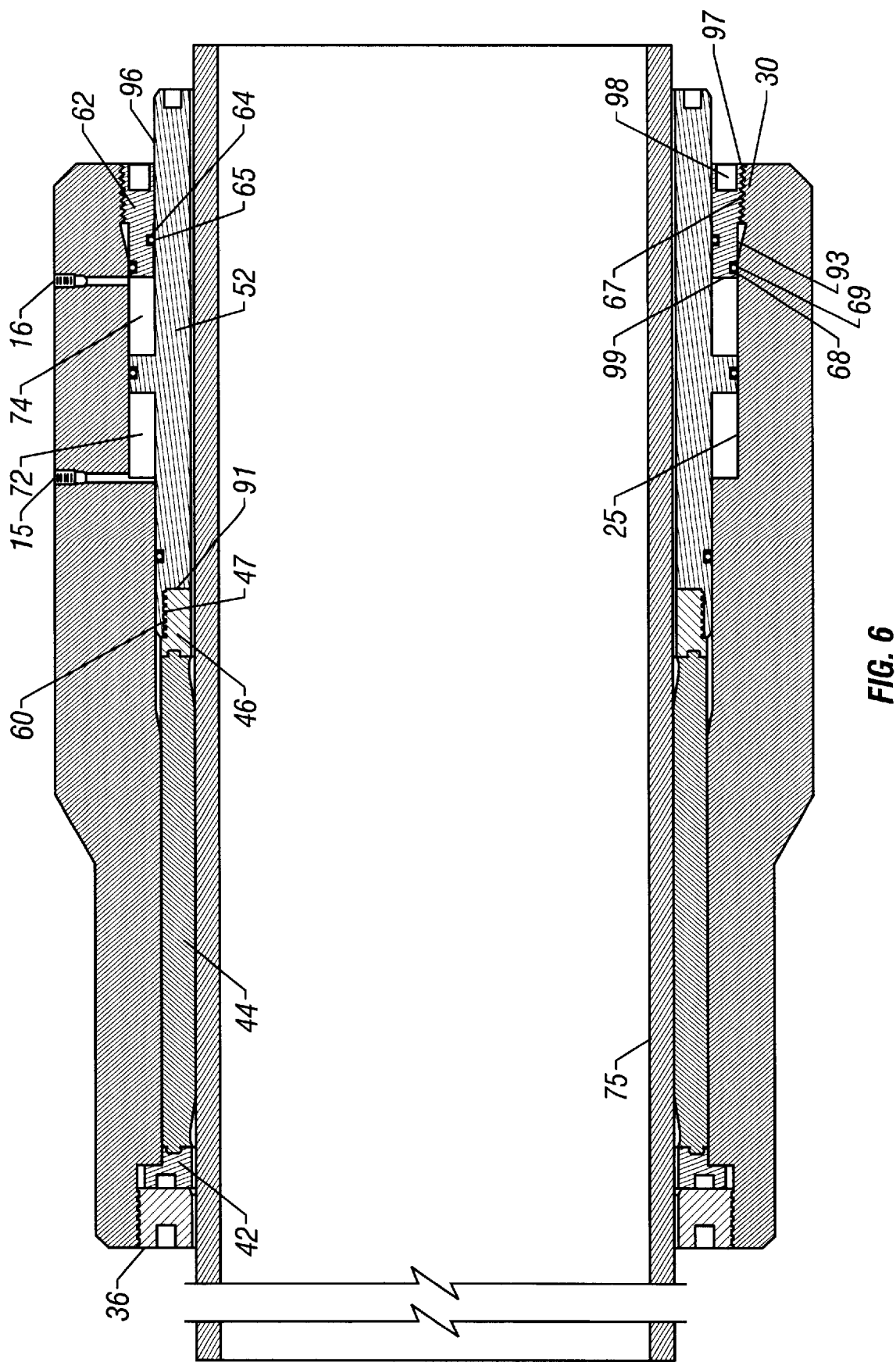
FIG. 6 is a longitudinal sectional view of the gripping device of FIG. 1 with the gripping element biased against and gripping a pipe.

The description of the internals of gripping device 10 is common to its operating states shown in FIGS. 4, 5, and 6. Referring now to FIG. 3 (with the bottom of the device 10 on the left), female thread 18 with a large thread relief extends to downwardly facing lower transverse shoulder 19. Main through bore 20 extends approximately halfway through housing 12 from lower transverse shoulder 19 to upwardly facing small shoulder 21.

First polished counterbore 24 is located above small transverse shoulder 21. Second polished counterbore 25 is located above first counterbore 24 and connected by upwardly looking large transverse shoulder 27. First hydraulic actuation port 15 intersects second counterbore 25 adjacent large transverse shoulder 27. Second hydraulic actuation port 16 also intersects second counterbore 25 near its upper end. Female thread 30 is located at the upper end of housing 12, where its thread relief is joined to second counterbore 25 by conically tapered transition 31.

Annular bottom retainer ring 36 has transverse upper and lower faces and a smooth through bore to clear the outer diameter of any cylindrical objects which will be gripped by this device 10. Male thread 37 on the exterior of bottom retainer ring 36 engages female thread 18 of housing 12 to retain the internals of gripping device 10 on the lower end. Spanner holes 38 are provided on the lower face of bottom retainer ring 36 to facilitate assembly.

Gripper assembly 40, as seen in FIG. 4, consists of gripper anchor 42, elastomeric gripper element 44, and movable gripper end 46. Gripper assembly 40 is positioned within main through bore 20 of device 10. Annular gripper anchor 42 has a smooth through bore the same diameter as that of bottom retainer ring 36 and a transverse lower face 32 provided with multiple spanner holes 39. Gripper anchor 42 has a stepped outer profile with a larger cylindrical surface 33 located below a smaller cylindrical face 35, said faces being separated by an upwardly facing transverse shoulder 29. As shown in FIG. 3, the upwardly facing transverse shoulder 29 of gripper anchor 42 abuts lower transverse shoulder 19 of the housing 12, and the smaller outer cylindrical face 35 of gripper anchor 42 closely fits within main through bore 20 of housing 12.

The upper transverse face 28 of gripper anchor 42 has an optional radiused undercut face groove 57 to provide enhanced bonding for attachment of the elastomer of elastomeric gripper element 44. The elastomeric gripper element 44 may also have a substance having a high frictional coefficient, such as silica flour, embedded in its inner surface 66 that will comate with the object being gripped. In addition, the elastomeric gripping element may have one or more antiextrusion devices 63 embedded in and bonded to the elastomeric matrix of gripping element 44 to provide the gripping element 44 with increased strength and stability. A preferred embodiment will have more than one antiextrusion devices 63 embedded in the gripping element 44, with at least one at each end. If only one antiextrusion device is embedded in the gripping element 44, it would preferably be located at the lower end close to the gripper anchor 42. The antiextrusion device is further described in copending application entitled Antiextrusion Device filed Feb. 21, 2001 which is incorporated herein by reference. The inner diameter of such antiextrusion devices would be only slightly more than that of the gripping surface 66 of the gripping element.

Annular movable gripper end 46 has a groove 22 on its lower transverse face 26 similar to that on the upper transverse face 28 of gripper anchor 42. The outer cylindrical face of movable gripper end 46 is stepped, with the lower cylindrical face 43 closely fitting to the main through bore 20 of housing 12 and the upper cylindrical face having a reduced diameter male thread 47 with a thread relief A transverse face 23 of movable gripper end 46 connects the lower cylindrical face 43 with the thread relief adjacent male thread 47, while an upper transverse face 17 connects male thread 47 with the through bore of the part. Movable gripper end 46 has the same smooth through bore as that of bottom retainer ring 36.

Elastomeric gripper element 44 is molded onto gripper anchor 42 and movable gripper end 46. The outer diameter of gripper element 44 closely fits to main through bore 20 of housing 12, while the inner cylindrical face of gripper element 44 is smaller than the minimum size cylinder which will be gripped by this device. Transitional tapered lead-ins will connect the inner cylindrical face 66 of gripper element 44 with the bores of the gripper anchor 42 and movable gripper end 46. At least a tapered lead-in from the gripper anchor 42 to the gripping element 44 should be used to effect a progressive interference fit against a gripped object by the elastomeric gripping element.

Turning now to FIG. 3, piston 52 has an annular construction and is positioned upwardly from and connected to movable gripper end 46. Piston 52 has a head section 92 which has the largest outer diameter. Head section 92 is positioned between first reduced outer diameter section 94 on the lower side of piston 52 and second reduced outer diameter section 96 on the upper end of piston 52.

The head section 92 of piston 52 is a cylindrical surface carrying a male O-ring groove 54 in which O-ring 55 is positioned so that it can seal between piston 52 and second polished counterbore 25 of housing 12. First reduced outer diameter cylindrical section 94 is sized to slide freely within the first polished counterbore 24 of housing 12; male O-ring groove 56 carrying O-ring 57 is positioned intermediately in first reduced outer diameter cylindrical section 94. Second reduced outer diameter cylindrical section 96 of piston 52 has the same diameter as the first section 94 and has a first hydraulic chamber 72 between it and second reduced outer diameter cylindrical section 96. Spanner holes 59 in upper end transverse face 95 permit application of torque to the piston 52 for assembly of the piston to the gripping element 44.

Still referring to FIG. 3, piston 52 through bore has the same diameter as bottom retainer ring 36. Lower end transverse face of piston 52 is counterbored and provided with female thread 60, a thread relief, and a transverse shoulder 91 between the thread relief and the through bore. Piston 52 is threadedly connected to movable gripper end 46 by male thread 47 and female thread 60.

Annular top retainer ring 62 has a through bore closely mating to the second reduced outer diameter cylindrical section 96 of piston 52. Female O-ring groove 64 carrying O-ring 65 is positioned near the lower end of the through bore of top retainer ring 62. The upper transverse face 97 of top retainer ring 62 is provided with spanner holes 98 for assembly purposes. Male thread 67 is located on the largest outer diameter cylindrical section of top retainer ring 62 adjacent the upper transverse face 97. Male thread 67 is engaged with female thread 30 of housing 12 to retain the internals of the gripper device 10.

Below male thread 67 is located second reduced outer diameter cylindrical segment 93 of top retainer ring 62, with male O-ring groove 68 near its lower end and O-ring 69 positioned therein. The second reduced outer diameter cylindrical segment 93 of top retainer ring 62 closely fits to the second polished bore 25 of housing 12, so O-ring 69 seals against the second polished bore 25 of housing 12. The second reduced outer diameter cylindrical segment 93 of top retainer ring 62 is joined to the through bore by a transverse lower face 99.

An annular first hydraulic chamber 72, accessible through first hydraulic port 15, is defined between O-rings 55 and 57, with piston 52 as the chamber inner wall and housing 12 as its outer wall. Second hydraulic port 16 intersects second polished counterbore 25 of housing 12 below O-ring 69 on the lower end of top retainer ring 62. An annular second hydraulic chamber 74, accessible through second hydraulic port 16, is defined between O-rings 55, 65, and 69 with piston 52 as the chamber inner wall and housing 12 as its outer wall.

Referring to FIG. 6, a length of pipe 75 is shown inserted within the bore of the gripping device 10 and engaged by gripping element 44.

Operation of the Embodiments of the Invention

The gripping device 10 is shown in FIG. 3 in a relaxed, inactivated state. The gripping device in FIG. 3 has no hydraulic pressure applied to piston 52 through either hydraulic port 15 or 16, so the elastomeric gripping element 44 is untensioned and free to assume its as-molded shape. The as-molded shape of elastomeric gripping element 44 is such that it will, when relaxed, have a substantial interference fit with the smallest cylindrical object which it is designed to grip.

The same gripping device 10 is shown in FIG. 5 in its stretched configuration for receiving installation of a cylindrical object such as a pipe into its bore preparatory for gripping said object. Normally, the object to be gripped is inserted through the lower end of the gripping device, and during lifting the object will be supported in a manner such that the axis of the gripping device is vertical. The gripping device is typically supported by suitable means, such as lifting cables attached to the lifting eyes 14 when it is being used for gripping. However, it should be noted that the preceding conditions are not requirements.

The configuration of FIG. 5 is attained by applying and maintaining hydraulic pressure to hydraulic port 15 and, hence, to chamber 72 in order to cause piston 52 to be forced upwardly (to the right of the drawings). When piston 52 is forced upwardly, the elastomer of elastomeric gripping element 44 is stretched, since the gripper anchor 42 is restrained by lower transverse shoulder 19 of housing 12. The pressure applied to first hydraulic port 15 must be sufficient to cause sufficient stretch in elastomeric gripping element 44 so that its cross-sectional radial thickness will be sufficiently reduced (i.e., its inner diameter increased) at its inner diameter section to eliminate the fit interference of its unstretched state shown in FIG. 3 with the object, such as pipe 75, to be gripped.

FIG. 6 shows gripping device 10 holding a pipe 75. The pressure in first hydraulic chamber 72 has been released through first hydraulic port 15, permitting the elastomer of elastomeric gripping element 44 to rebound inwardly and downwardly (towards the left of the Figure) in an attempt to resume its unstressed as-molded state. Because the diameter and ovality of the pipe 75 are controlled by factory tolerances to lie within a known range, the inner diameter of the elastomeric gripping element 44 is deliberately molded sufficiently smaller than the minimum pipe size to ensure an interference fit with the pipe 75. Thus, in the process of attempting to return to its molded shape from its stretched position, the elastomeric gripping element 44 will assume a position such that it conforms to the local contours of the pipe 75 and presses strongly against it in a radial direction to effect a highly preloaded interfacial contact. The elastomer cannot fully rebound with the pipe present, due to the essentially incompressible nature of the elastomer. Thus, piston 52 does not fully return to its unloaded position shown in FIG. 3 when the pipe 75 is present.

The high interfacial contact stresses of the gripper element 44 on pipe 75 permit the development of proportionately high frictional forces on the same interface, particularly since the elastomer will be selected on the basis of having a high coefficient of friction. The high interfacial frictional forces permit using the clamp as a reliable device to grip the object. If pipe 75 moves downward following initial gripping, the attendant frictional drag on the elastomer forces the elastomer into even more intimate contact with higher interfacial stresses and, hence, better gripping. Release of the gripped object is simply accomplished by reapplying pressure to the first hydraulic chamber 72 in order to restretch gripper element 44 and thereby eliminate its interference fit.

For long gripper elements, it is possible that excessive friction drag may occur between gripper element 44 and either pipe 75 or the main through bore 20 of housing 12, thereby interfering with developing adequate compressive forces on the elastomer/pipe interface. It is very simple in such a case to remedy the problem by applying temporary hydraulic pressure to second hydraulic chamber 74 through second hydraulic port 16 and thereby overcome the frictional drag which would otherwise prevent the elastomeric element from fully seating against the pipe. It is not necessary to maintain the hydraulic pressure on second hydraulic chamber 74 to ensure adequate gripping. An alternative or supplemental method of avoiding the frictional drag problem is to slightly taper the inner diameter of the contact surface of gripping element 44, between the tapered leadins, so that the inner diameter of the gripping surface is slightly larger on its upper end. With this modification, the seating of elastomeric gripper element 44 against pipe 75 will proceed progressively upwardly from the bottom to the top, thereby aiding in obtaining proper seating. Additionally, downward axial loads from pipe 75 on gripper element 44 during lifting aid in seating the elastomer against the pipe.

Longer gripper elements may also demonstrate a tendency to 'neck down' in the middle when subjected to high tensions. This tendency is easily controlled by using integrally bonded rigid intermediate rings 112 which either partially or fully segment the elastomer to radially stiffen the gripping element 44. Such rigid intermediate rings 112, shown for clarity only in FIG. 5, cannot have outer diameters larger than that of the main through bore 20 of housing 12 nor can their inner diameters be less than the clearance diameter for the gripped cylindrical object. Gripping may be enhanced by integrally bonding high friction elements into the elastomeric matrix of the gripping element or laminating a high friction surface material to the internal surface of the elastomeric gripping element 44.

Advantages of This Invention

The advantages of this invention accrue primarily from: a) the molded shape of the elastomeric gripping element allowing the gripping element to be designed to have a non-marring interference fit with a wide range of object sizes and shapes, b) stretching of the elastomeric gripping element to avoid significant fit interference when the object to be gripped is being inserted into the device 10, and c) the ability of the gripping element to attempt to return to its as-molded shape and thereby passively assume a presqueezed condition against its comating object surface simply by releasing the installation tension on the elastomeric gripping element.

Conventional gripping devices rely upon active elements which are not molded or formed to have an interference fit and are installed with no interference fit but then must be actively compressed to cause interference with their comating surface.

Prestretching an elastomeric gripper element for its installation adjacent a comating object surface so that its cross-section thickness is reduced permits very high but controllable presqueezes for ensuring reliable gripping. Having an elastomeric gripper element which is sized to always assume an interference fit against its comating object surface in attempting to return to its molded shape following stretching ensures that the gripper element will always be sufficiently biased against its comating surface due to the locked-in stresses in the elastomer. This interfacial bias against the gripped object is maintained passively by the tendency of the elastomer to return to its molded, minimal energy shape. Thus, the interfacial biasing force of this invention is obtained by a passive means rather than the active means or gravity relied on by current devices. The gripper device described herein is always passively urged (i.e., without outside intervention) to have adequate presqueeze on the object interface in spite of elastomer shrinkage or creep. This maintenance of proper presqueeze with shrinkage or creep is not feasible with conventional elastomeric grippers without actively recompressing the gripping element. Recompression of the gripping element is often impractical and the need for recompression is typically unrecognized until it is too late and the gripper has failed during use.

Furthermore, in contrast to the conventional active elastomeric grippers, the level of presqueeze for the grippers of this invention is controllable by selection of the gripping element's general geometry, the elastomeric compound from which it is constructed, and the minimum amount of interference fit designed into the gripping device 10. In contrast, conventional active grippers frequently are overcompressed by installation personnel when presqueeze is applied, with the result that the pipe or other gripped object may be locally necked down in an excessive manner. This situation is particularly difficult to avoid with screws applying the active loading on conventional grippers, even when jack screw torsions are carefully controlled, since screw and elastomer friction are highly variable and unknown.

The ability to overcome friction, which resists the gripping element assuming its as-molded condition after release of the installation tension, by means of temporarily hydraulically biasing the actuating piston downwardly to overcome the friction, is another strong advantage of this apparatus. This approach to gripping is applicable to both male and female gripping devices and is applicable to a variety of cross-sectional shapes of the gripped member. For picking up gravity loads, it is preferable for the tensioning of the elastomer to be applied upwardly so that the gravity load will contribute to grip performance.

By using a smooth elastomer without aggressively abrasive additives, this type of gripping device will not mar sensitive surfaces. The active surface of the elastomeric gripper element may be mildly ridged or waffled so that water or other problematic materials can be excluded from the heavily preloaded elastomer/comating surface interface and good frictional properties thereby maintained.

A particular advantage of this type of gripping device is that it can be designed to grip a wider range of object sizes than a collet type of gripper. Additionally, this design is compact, robust, does not require intricate or precision machining, and is inexpensive. The passive gripping device is a much safer approach to handling dangerous objects than the traditional active gripping devices. Release of the gripped object is also particularly simple compared to slip-type grippers, which are prone to jamming.

It readily may be understood that the gripping device of this invention may be somewhat changed from what is shown for this embodiment without departing from this invention. For instance, the bonding surfaces of the gripper anchor upper end and the movable gripper end can varied from the types shown in the drawings for this invention without exceeding the limits of this invention. Similarly, the gripper embodiment can be adapted readily to both planar or near planar or irregularly shaped objects. For instance, a one-sided planar gripper having the basic design characteristics of this device and operated by a conventional hydraulic piston and which entraps a planar object against a static planar surface on its obverse side is consistent with this invention. The gripping device of this invention is not limited to only tubular objects.

The gripping device shown in the drawings of this patent can be everted so that the operative features are mounted on a mandrel, rather than in an outer housing, so that a male gripping device is also consistent with the principles of this invention. The stretching of the gripping element also can be performed by wedging, camming, or other suitable means without departing from this invention. Multiple hydraulic cylinders or cylinders with arcuate or lunate or unusually shaped pistons can also be used for hydraulic tensioning of the gripping element for installation. These tensioning variations are desirable for semicircular or other irregularly shaped objects.

Thus, having described several embodiments of the gripping device and its use, it is believed that other modifications, variations, and changes will be suggested to those skilled in the art in view of the description set forth above. It is therefore to be understood that all such variations, modifications, and changes are believed to fall within the scope of the invention as defined in the appended claims.

What is claimed is:

1. A gripping apparatus comprising:
 a housing;
 an elastomeric gripping element, wherein a first end of the gripping element is anchored to one end of said housing;
 a reciprocably movable end, said movable end attached to a second end of the gripping element; and
 means for reciprocably moving said movable end axially relative to said housing between a first position and a second position;
 whereby when said movable end is in the first position said elastomeric gripping element is stretched and will not grip an object, and as said movable end moves towards the second position said elastomeric gripping element becomes untensioned and is passively biased against an object to grip the object.

2. The gripping element of claim 1, wherein said housing is tubular.

3. The gripping apparatus of claim 1, wherein said elastomeric gripping element has an annular configuration, said gripping element is positioned within a bore of said housing and biased against an exterior surface of objects placed within the bore of said gripping element when said gripping element is released from the first position to move to the second position or between the first and second position.

4. The gripping apparatus of claim 1, wherein said the housing is a mandrel and the gripping element is connected to an exterior surface of said mandrel, the gripping element gripping an interior surface of an object surrounding the gripping element as said gripping element is released from said first position to shift from the first position towards the second position.

5. The gripping apparatus of claim 1, the gripping apparatus for securing an object adjacent to a gripping surface of the gripping element further comprising biasing means such that the gripping surface will be biased against an exterior surface of the object as the gripping element moves from the first position towards the second position.

6. The gripping apparatus of claim 5, wherein said biasing means is rendered ineffective when the gripping element moves from the second position towards the first position.

7. The gripping apparatus of claim 1, wherein the elastomeric gripping element has a substance with a high frictional coefficient embedded in a gripping surface of the gripping element.

8. The gripping apparatus of claim 7, wherein the substance is a silica flour.

9. The gripping apparatus of claim 1, wherein the elastomeric gripping element has a gripping surface that is ridged or waffled.

10. The gripping apparatus of claim 1, wherein the gripping element has at least one antiextrusion device embedded in and bonded to an elastomeric matrix of said gripping element and wherein at least one antiextrusion device is closer to the first end of the gripping element than to the second end of the gripping element.

11. The gripping apparatus of claim 1, wherein a contact surface of the gripper element is tapered from the first end towards the second end.

12. The gripping apparatus of claim 1, wherein the gripping element has at least one rigid ring that partially or fully radially stiffens the gripping element.

13. The gripping apparatus of claim 1, wherein the moving means is one or more hydraulic cylinders.

14. The gripping apparatus of claim 13, wherein the hydraulic cylinder can be used to urge the movable end towards the second position to overcome friction.

15. A gripping apparatus comprising:
  a housing;
  an elastomeric gripping element, wherein a first end of the gripping element is anchored to one end of said housing;
  a reciprocably movable end, said movable end attached to a second end of the gripping element;
  reciprocable means for imparting movement to the movable end relative to said housing, said reciprocable means connected to said movable end, wherein the movable end moves along a path defined by a first position and a second position;
  actuation means for reversibly imparting movement to said reciprocable means and the movable end;
  whereby when said movable end is in the first position said elastomeric gripping element is relaxed and when said movable end is in the second position said elastomeric gripping element is stretched.

16. The gripping apparatus of claim 15, wherein said elastomeric gripping element has an annular configuration and is positioned within a through bore of said housing, said gripping element biased against an exterior surface of objects placed within the bore of said gripping element when said movable end is in the first position or between the first and second position.

17. The gripping apparatus of claim 16, wherein when the movable end is in the second position and the elastomeric gripping element is stretched, an interior circumference of the elastomeric gripping element is larger than the exterior perimeter of an object to be gripped, and when the movable end is in the first position and the elastomeric gripping element is relaxed the interior circumference of the elastomeric gripping element is less than the perimeter of the object to be gripped by the gripping apparatus.

18. The gripping apparatus of claim 15, wherein the actuation means is a hydraulic fluid and said reciprocable means is one or more hydraulic cylinders.

19. The gripping apparatus of claim 15, wherein the gripping element has a gripping surface having a substance with a high frictional coefficient embedded in or integral with the gripping surface.

20. The gripping apparatus of claim 15, wherein the gripping element has at least one rigid ring that radially stiffens the gripping element.

21. The gripping apparatus of claim 15, wherein the gripping element has at least one antiextrusion device embedded and bonded to an elastomeric matrix of said gripping element.

22. The gripping element of claim 21, wherein at least one antiextrusion device is closer to the first end of the gripping element than to the second end of the gripping element.

23. A gripping apparatus comprising:
  a tubular housing;
  a gripper assembly comprising:
    an elastomeric gripping element,
    an anchor end, said anchor end bonded to a first end of the gripping element, and
    a reciprocably movable end, said movable end bonded to a second end of the gripping element;
  a reciprocable piston connected to said movable end, said piston movable along a path defined by a first position and a second position; and
  a hydraulic cylinder having a first and second hydraulic chamber, wherein when hydraulic pressure is applied to the first hydraulic chamber the piston moves to the second position thereby moving the movable end of the gripper assembly and stretching the elastomeric gripping element, and when hydraulic pressure is applied to the second hydraulic chamber the piston moves towards the first position thereby moving the movable end of the gripper assembly and easing the tension on the gripping element.

24. The gripping apparatus of claim 23, wherein the elastomeric gripping element has a substance with a high frictional coefficient embedded in a gripping surface of the gripping element.

25. The gripping apparatus of claim 23, wherein the gripping element has at least one antiextrusion device embedded and bonded to an elastomeric matrix of the gripping element.

26. The gripping apparatus of claim 23, wherein the gripping element has at least one rigid ring that radially stiffens the gripping element.

27. The gripping apparatus of claim 23, wherein when the piston is in the second position and the elastomeric gripping element is stretched an interior circumference of the elastomeric gripping element is greater than the exterior perimeter of an object to be gripped by the gripping apparatus, and wherein when the piston is in the first position and the elastomeric gripping element is relaxed the interior circumference of the elastomeric gripping element is less than the exterior perimeter of the object to be gripped by the gripping apparatus.

28. A gripping apparatus comprising:
  a housing;
  a gripper assembly comprising:
    an elastomeric gripping element,
    an anchor end, said anchor end bonded to a first end of the gripping element, and a reciprocably movable end, said movable end bonded to a second end of the gripping element;

at least one hydraulic cylinder, each cylinder having a reciprocable piston, wherein said piston is connected to said movable end and is movable along a path defined by a first position and a second position;

a first hydraulic chamber of each cylinder, wherein when hydraulic pressure is applied to the first hydraulic chamber the piston moves to the second position thereby moving the movable end of the gripper assembly and stretching the elastomeric gripping element; and a second hydraulic chamber of each hydraulic chamber, wherein when hydraulic pressure is applied to the second hydraulic chamber the piston moves toward the first position thereby moving the movable end of the gripper assembly and easing the tension on the gripping element.

29. The gripping apparatus of claim 28, wherein when the piston of each cylinder is in the second position and the elastomeric gripping element is stretched an interior circumference of the elastomeric gripping element is greater than the exterior perimeter of an object to be gripped by the gripping apparatus, and wherein when the piston of each cylinder is in the first position and the elastomeric gripping element is relaxed the interior circumference of the elastomeric gripping element is less than the exterior perimeter of the object to be gripped by the gripping apparatus.

30. A process for gripping an object comprising:
  (a) selecting the object to be gripped by a gripping apparatus, said gripping apparatus comprising:
    a housing;
    an elastomeric gripping element, wherein the gripping element is positioned within a through bore of said housing and a first end of the gripping element is anchored to one end of said housing;
    a reciprocably movable end, said movable end attached to a second end of the gripping element; and
    means for reciprocably moving said movable end between a first position and a second position;
    whereby when said movable end is in a first position said elastomeric gripping element is stretched and will not grip an object, and as said movable end moves towards the second position said elastomeric gripping element becomes relaxed and is passively biased against an object to grip the object;
  (b) moving the movable end of the gripping apparatus to the first position, thereby tensioning the elastomeric gripping element;
  (c) inserting the object into an interior of the gripping apparatus adjacent to a gripping surface of the gripping element while the gripping element is tensioned; and
  (d) moving the movable end toward the second position to bias the gripping surface against an exterior surface of the object to be gripped.

31. The process of claim 30, wherein the gripping element has an annular configuration.

32. The process of claim 31, wherein when the movable end is in the first position and the elastomeric gripping element is stretched an interior circumference of the elastomeric gripping element is greater than the exterior perimeter of an object, and wherein when the movable end is in the second position and the elastomeric gripping element is relaxed the interior circumference of the elastomeric gripping element is less than the exterior perimeter of the object.

33. The process of claim 30, wherein the object to be gripped is cylindrical.

34. The process of claim 30, wherein the moving means is one or more hydraulic cylinders.

35. A process for gripping an object comprising:
  (a) selecting the object to be gripped with a gripping apparatus, said gripping apparatus comprising:
    a tubular housing;
    a gripper assembly comprising:
      an elastomeric gripping element,
      an anchor end, said anchor end bonded to a first end of the gripping element, and
      a reciprocably movable end, said movable end bonded to a second end of the gripping element;
    at least one hydraulic cylinder, each cylinder having a reciprocable piston, wherein said piston is connected to said movable end and is movable along a path defined by a first position and a second position;
    a first hydraulic chamber of each cylinder, wherein when hydraulic pressure is applied to the first hydraulic cylinder the piston moves to the second position thereby moving the movable end of the gripping assembly and tensioning the elastomeric gripping element; and
    a second hydraulic chamber of each cylinder, wherein when hydraulic pressure is applied to the second hydraulic cylinder the piston moves toward the first position thereby moving the movable end and easing the tension on the gripping element;
  (b) applying hydraulic pressure to the first hydraulic chamber to move the movable end to the second position, thereby tensioning the elastomeric gripper element;
  (c) inserting the object into a through bore of the gripping element while the gripping element is tensioned; and
  (d) releasing hydraulic pressure from the first hydraulic chamber easing the tension on the gripping element to bias the gripping element against the object to be gripped.

36. The process of claim 35, further comprising the step of applying hydraulic pressure to the second hydraulic chamber to further bias said gripping element against the object to be gripped.

37. The process of claim 35, wherein the object to be gripped is cylindrical.

38. A process for manufacturing a gripping element to be mounted in the gripping apparatus of claim 1 comprising:
  selecting a range of exterior perimeters for an object to be gripped by the gripping apparatus;
  selecting an elastomeric material of which the gripping element is to be made; and
  an elastomeric gripping element for gripping the object, wherein a length and a thickness of said gripping element is determined by the selected range of exterior perimeters for the object to be gripped and the selected elastomeric material.

39. The process of claim 38, further comprising the step of bonding said elastomeric gripping element to a static end that is securable to one end of the housing and bonding said elastomeric gripping element to a movable end.

40. The process of claim 38, wherein the gripping element has a substance with a high frictional coefficient embedded in a gripping surface of said gripping element.

41. The process of claim 38, wherein the griping element has at least one rigid ring intermediate a length of the gripping element to axially stiffen the gripping element.

42. The process of claim 38, wherein the gripping element has at least one antiextrusion device embedded in and bonded to the elastomeric material.

* * * * *